US009752009B2

(12) United States Patent
Stockdale et al.

(10) Patent No.: US 9,752,009 B2
(45) Date of Patent: Sep. 5, 2017

(54) FLAME RETARDANT POLYMER COMPOSITIONS COMPRISING HEAT TREATED PHOSPHORUS COMPOUNDS AND MELAM

(71) Applicant: Chemtura Corporation, Middlebury, CT (US)

(72) Inventors: Zachary D Stockdale, West Lafayette, IN (US); Larry D Timberlake, West Lafayette, IN (US); Mark V Hanson, West Lafayette, IN (US)

(73) Assignee: LANXESS Solutions US Inc., Middlebury, CT (US)

( * ) Notice: Subject to any disclaimer, the term of this patent is extended or adjusted under 35 U.S.C. 154(b) by 0 days.

(21) Appl. No.: 14/754,857

(22) Filed: Jun. 30, 2015

(65) Prior Publication Data
US 2016/0215122 A1    Jul. 28, 2016

Related U.S. Application Data

(60) Provisional application No. 62/107,567, filed on Jan. 26, 2015.

(51) Int. Cl.
| | |
|---|---|
| C08K 5/3492 | (2006.01) |
| C08K 5/5333 | (2006.01) |
| C08K 5/00 | (2006.01) |
| C08K 5/5317 | (2006.01) |
| C08K 3/00 | (2006.01) |
| C08K 3/04 | (2006.01) |
| C08L 77/02 | (2006.01) |
| C08L 77/06 | (2006.01) |

(52) U.S. Cl.
CPC ........ C08K 5/34922 (2013.01); C08K 3/0058 (2013.01); C08K 3/04 (2013.01); C08K 5/0066 (2013.01); C08K 5/5317 (2013.01); C08K 5/5333 (2013.01); C08L 77/02 (2013.01); C08L 77/06 (2013.01)

(58) Field of Classification Search
CPC ................. C08K 3/32; C08K 5/5313
See application file for complete search history.

(56) References Cited

U.S. PATENT DOCUMENTS

| | | | |
|---|---|---|---|
| 3,894,986 A | 7/1975 | Racky et al. | |
| 4,972,011 A | 11/1990 | Richardson et al. | |
| 5,053,148 A * | 10/1991 | von Bonin | C04B 38/00 106/122 |
| 5,780,534 A | 7/1998 | Kleiner et al. | |
| 6,255,371 B1 | 7/2001 | Schlosser et al. | |
| 6,365,071 B1 | 4/2002 | Jenewen | |
| 6,472,448 B2 | 10/2002 | Witte et al. | |
| 6,547,992 B1 | 4/2003 | Schlosser et al. | |
| 7,531,585 B2 | 5/2009 | Ozawa et al. | |
| 8,445,718 B2 | 5/2013 | Suwa et al. | |
| 2001/0008913 A1 | 7/2001 | Flippo et al. | |
| 2003/0096946 A1 | 5/2003 | Heinen | |
| 2006/0138391 A1* | 6/2006 | Drewes | C08K 5/34928 252/601 |
| 2007/0029532 A1 | 2/2007 | Hansel et al. | |
| 2015/0031805 A1 | 1/2015 | Stockdale et al. | |
| 2015/0141556 A1 | 5/2015 | Stockdale et al. | |

FOREIGN PATENT DOCUMENTS

| | | |
|---|---|---|
| DE | 3833977 | 4/1990 |
| WO | 2005097894 A1 | 10/2005 |
| WO | 2010131678 A1 | 11/2010 |
| WO | 2012045414 | 4/2012 |

OTHER PUBLICATIONS

PCT International Search Report and Written Opinion dated Dec. 17, 2015 from corresponding Application No. PCT/US2015/055206, 10 pages.
Japanese Office Action dated Jun. 23, 2016 from corresponding JP Application No. 2015-539971, along with unofficial English translation, 10 pages.

* cited by examiner

*Primary Examiner* — Lanee Reuther
(74) *Attorney, Agent, or Firm* — Dilworth IP LLC

(57) ABSTRACT

Flame retardant polymer compositions with excellent processing stability and flame retardant activity are obtained by incorporating into the polymer a flame retardant obtained by heating certain phosphonic acid salts at temperatures of 200° C. or higher and as flame retardant synergist melam or a melam derivative, which compositions are more readily processed under certain harsh conditions than similar compositions comprising similar synergists such as melem, melon and the like.

19 Claims, No Drawings

FLAME RETARDANT POLYMER COMPOSITIONS COMPRISING HEAT TREATED PHOSPHORUS COMPOUNDS AND MELAM

This application claims benefit under 35 USC 119(e) of U.S. Provisional Application No. 62/107,567, filed Jan. 26, 2015, the disclosure of which is incorporated herein by reference.

Flame retardant polymer compositions comprising flame retardants obtained by heating certain phosphonic acid salts at temperatures of 200° C. or higher exhibit better processing stability under certain demanding conditions and/or flame retardant activity in the presence of the flame retardant synergists melam or melam derivatives than when the composition comprises similar synergists such as melem, melon and the like.

BACKGROUND OF THE INVENTION

The use of flame retardant additives to polymers, such as polyolefins, polyesters, polycarbonates, polyamides, polyurethanes, epoxy resins, and other thermoplastic or thermoset polymer resins, is long known. It is also well known that the stability of the resultant flame retardant/polymer composition, for example, short or long term thermal stability, stability on exposure to other environmental agents or other chemical components, etc., can be compromised depending on the resins and particular flame retardants employed. Many flame retardant polymer compositions also contain a flame retardant synergist to boost the activity of the main flame retardant.

Thermal processing of polymers often exposes a polymer composition to high temperatures under severe conditions, and many known flame retardants, and synergists, are not suitable for use under these conditions because they are too volatile, not sufficiently thermally stable, have an adverse effect on the chemical or mechanical properties of the resin, etc. Certain organophosphorus flame retardant compounds, such as some phosphate esters, can also exhibit a plasticizing effect which may adversely affect mechanical properties of the polymers into which they are added. Some compounds are not stable in certain polymers under processing conditions, for example, some phosphates are relatively unstable to hydrolysis, which can not only deplete the flame retardant but can result in undesired formation of various phosphoric acid compounds and degradation of the resin.

Salts of phosphorus containing acids are known flame-retardant additives, for example, U.S. Pat. No. 3,894,986 discloses flame retardant thermoplastic polyesters containing alkali salts of phosphoric acids; U.S. Pat. No. 4,972,011 discloses aluminum salts of alkylphosphonic acids or monoalkyl esters of alkane-phosphonic acids, i.e., salts of compounds of formula (Ia), wherein R is for example methyl, ethyl, propyl or isopropyl etc., and R' is hydrogen, methyl, ethyl, propyl, or isopropyl.

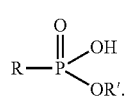

(Ia)

DE 3833977 discloses the preparation of metal salts of compounds of formula (Ia) via reactions of dimethylmethylphosphinate and metal oxides or hydroxides in water at high pressures and temperatures from 120 to 200° C. and adducts of these salts with amines such as ethylene diamine and melamine, and use of the adducts as flame retardants in thermoplastics.

Salts of phosphinic acids, i.e., compounds of formula (II) wherein $R_1$ and $R_2$ are alkyl or carbon based aromatic, are also known flame-retardant additives for thermoplastic polymers.

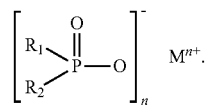

(II)

Salts wherein M is selected from Mg, Ca, Al, Sb, Sn, Ge, Ti, Zn, Fe, Zr, Ce, Bi, Li, Na, K or protonated nitrogen base are known. For example, U.S. Pat. Nos. 5,780,534 and 6,013,707 disclose that calcium phosphinates and aluminum phosphinates of Formula (II) are said to be particularly effective in polyester.

As is common with many flame retardant systems, the performance of phosphorus containing acid derivatives can be enhanced by the presence of other flame retardant agents, synergists and adjuvants. U.S. Pat. No. 6,472,448 discloses flame retardant rigid polyurethane foam wherein a combination of oxalkylated alkylphosphonic acids and ammonium polyphosphate is present as flame retardant.

U.S. Pat. No. 6,365,071 discloses a synergistic flame retardant combination for thermoplastic polymers, comprising A) a phosphinic salt of the formula (II) above and B) a nitrogen compound such as allantoin, benzoguanamine, glycoluril, urea cyanurate, melamine cyanurate and melamine phosphate. U.S. Pat. No. 6,255,371 discloses a flame retardant combination comprising, A) a phosphinate of formula (II) above and B) condensation or reaction products of melamine e.g., melamine polyphosphate, melam polyphosphate and melem polyphosphate. U.S. Pat. No. 6,547,992 discloses a flame retardant combination for thermoplastic polymers comprising phosphinates and small amounts of inorganic and/or mineral compounds which do not contain nitrogen.

The phosphinates cited, e.g., in U.S. Pat. Nos. 6,365,071 and 6,255,371, are said to be thermally stable, however, these materials are not necessarily suitable for use in all polymer systems and may create problems for processing under more demanding conditions or may lack the flame retardant effectiveness needed for certain polymers.

The metal salts of compounds according to formula (Ia), are also reported to be thermally stable, but this is of course a relative term. As disclosed in US 2007/0029532, decomposition of such phosphonic acid salts is well known at temperatures encountered during processing of polyesters and polyamides, damaging the polymers in the process.

U.S. Pat. No. 5,053,148 discloses heat resistant foams obtained by heating metal phosphonates or metal phosphonate precursors to temperatures of above 200° C. useful, e.g., as electrical and/or heat insulation materials. Also disclosed is the use of this reaction to expand or render porous other substrates. Such substrates include, for example, thermoplastic polymers or plastics such as aromatic polyesters, polyethers, polysulfides, polyamides, polycarbonates, polyimides, polysiloxanes or polyphosphazenes, can be introduced into the foaming operation as a mixture with metal phosphonates and/or their precursors.

While U.S. Pat. No. 5,053,148 may suggest that a porous polyamide may be produced by heating a mixture of a metal phosphonate and a polyamide according to the "foaming process", nothing in U.S. Pat. No. 5,053,148 addresses or refutes the disclosure of US 2007/0029532 that decomposition of such phosphonic acid salts at high temperature gives "brittle compositions which are unusable" as an engineering thermoplastic. Outside of suggesting that a porous foam may be produced by heating metal phosphonate and a polymer such as polyamide, U.S. Pat. No. 5,053,148 contains no mention of what the properties of such an unexemplified material might be.

The difficulty of thermally processing certain thermoplastic resins in the presence of alkylphosphonic acid metal salts, and the poor physical properties of the polymer composition obtained thereby, has been confirmed by experimentation.

Copending U.S. patent application Ser. Nos. 14/337,500 and 14/592,472, disclose that the products obtained by heating certain alkylphosphonic acid metal salts, such as aluminum salts, calcium salts, zinc salts etc., at temperatures in excess of 200° C. are thermally stable at temperatures above 400° C. and can be thermally incorporated onto thermoplastic polymer resins to provide excellent flame retardant properties. Also is disclosed the use of a myriad of synergists which may further augment the flame retardant properties. In some cases however, certain polymer compositions containing the flame retardants of Ser. No. 14/337,500 and Ser. No. 14/592,472 that are processed under extremely harsh conditions may benefit from further process stabilization.

It has been found that in flame retardant polymer compositions comprising phosphorus containing flame retardants such as those of copending U.S. patent application Ser. No. 14/337,500 and Ser. No. 14/592,472, the presence of the flame retardant synergist melam can provide surprising advantages, for example, advantages in processing, which advantages are not seen with other similar melamine condensation products such as melem, melon and the like.

SUMMARY OF THE INVENTION

Flame retardant polymer compositions comprising:
a) a polymer, e.g., a thermoplastic polymer,
b) from 1% to 50%, by weight based on the total weight of the flame retardant composition, of a flame retardant material obtained by heating one, or more than one, phosphonic acid salt, i.e., compounds of formula (I)

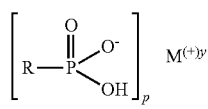

(I)

wherein R is an alkyl, aryl, alkylaryl or arylalkyl group,
p is a number of from 1 to 7, e.g., from 1 to 4, e.g., 1, 2, 3 or 4, M is a metal, y is a number of from 1 to 7, e.g., from 1 to 4, e.g., 1, 2, 3 or 4, often 2 or 3, so that $M^{(+)y}$ is a metal cation where (+)y represents the charge formally assigned to the cation,
at temperatures of 200° C. or higher, e.g., 220° C. or higher, generally at temperatures of 250° C. or higher, e.g. from about 250° C. to about 400° C. or from about 260° C. to about 360° C., and
c) one or more compounds selected from the group consisting of melam and melam derivatives, exhibit excellent good flame retardant properties and surprisingly good processability under demanding conditions when compared with compositions that use other melamine condensation products or derivatives thereof at similar concentrations.

Also provided is a method for preparing flame retardant polymers, which method comprises adding to a polymer resin a material obtained by heating compounds of formula (I) under conditions that chemically transform said compounds to a more thermally stable flame retardant material and one or more compounds selected from the group consisting of melam and melam derivatives and then processing the resulting mixture at elevated temperature.

Also provided is a method for preparing flame a retardant polymer composition, which method comprises adding to a polymer resin a material obtained by heating compounds of formula (I) under conditions that chemically transform said compounds to a more thermally stable flame retardant material, e.g., a material of component (b) above, and one or more compounds selected from the group consisting of melam and melam derivatives and then processing the resulting mixture at elevated temperature, e.g., by melt processing of the polymer and flame retardants at elevated temperature, such as extrusion.

Depending on the polymer resin and other materials present in the composition, the advantages of using melam and/or melam derivatives can be seen in various ways, e.g., better flame retardant activity at the same or lower load levels of the flame retardant and/or melam compound; greater stability during demanding processing, better physical properties of the resulting polymer composition, and the like.

DESCRIPTION OF THE INVENTION

Provided is a readily processed flame retardant polymer composition with excellent stability at elevated temperatures and under harsh conditions such as those experienced during extrusion.

That is, a flame retardant polymer composition comprising:
a) a polymer, e.g., a thermoplastic polymer,
b) from 1% to 50%, by weight based on the total weight of the flame retardant composition, of a flame retardant material obtained by heating one, or more than one, phosphonic acid salt, i.e., compounds of formula (I)

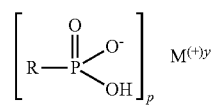

(I)

wherein R is an alkyl, aryl, alkylaryl or arylalkyl group,
p is a number of from 1 to 7, e.g., from 1 to 4, e.g., 1, 2, 3 or 4, M is a metal, y is a number of from 1 to 7, e.g., from 1 to 4, e.g., 1, 2, 3 or 4, often 2 or 3, so that $M^{(+)y}$ is a metal cation where (+)y represents the charge formally assigned to the cation,
at temperatures of 200° C. or higher, e.g., 220° C. or higher, generally at temperatures of 250° C. or higher, e.g. from about 250° C. to about 400° C. or from about 260° C. to about 360° C., and
c) one or more compounds selected from the group consisting of melam and melam derivatives.

Many embodiments further comprise flame retardants, synergists, adjuvants and other common additives in addition to the components b) and c) above.

The polymer of component a) is not particularly limited, but in many embodiments of the present invention the polymer is, e.g., selected from thermoplastics such as thermoplastic polyolefins, HIPS, polyesters, polycarbonates, polyamides, and the like, as well as epoxy resins and other resins with similar properties.

Materials useful as the flame retardant b) in the present composition can be found, e.g., in copending U.S. patent application Ser. Nos. 14/337,500 and 14/592,472, and methods for preparing the material can be found therein. These flame retardants are obtained by thermal conversion of salts of formula (I) before incorporation into the polymer composition. As shown, for example, in U.S. patent application Ser. No. 14/337,500 attempts to incorporate the compounds of formula (I) directly into polymers at elevated temperatures can cause polymer degradation. In general, the flame retardant material of b) is obtained by heating one, or more than one, phosphonic acid salt, i.e., compounds of formula (I)

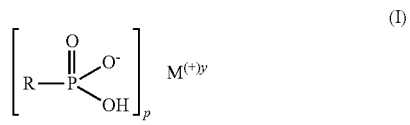

wherein R is an alkyl, aryl, alkylaryl or arylalkyl group, p is a number of from 1 to 7, e.g., from 1 to 4, e.g., 1, 2, 3 or 4, M is a metal, y is a number of from 1 to 7, e.g., from 1 to 4, e.g., 1, 2, 3 or 4, often 2 or 3, so that $M^{(+)y}$ is a metal cation where (+)y represents the charge formally assigned to the cation, at temperatures of 200° C. or higher, e.g., 220° C. or higher, generally at temperatures of 250° C. or higher, e.g. from about 250° C. to about 400° C. or from about 260° C. to about 360° C.

For example, in formula (I), $M^{(+)y}$ where y is 1 represents a mono-cation such as $Li^+$, $Na^+$ or $K^+$, $M^{(+)y}$ where y is 2 represents a di-cation such as $Mg^{++}$, $Ca^{++}$ or $Zn^{++}$ and the like, $M^{(+)y}$ where y is 3 represents a tri-cation such as $Al^{+++}$, etc. As is common with organometallic species, the formulae are idealized and the starting materials may include complex salts or salts where certain atomic valences are shared such as where a single oxygen anion is shared between two metal cations, etc. Typically, the starting salt is charged balanced, that is, a compound of formula (I) wherein p=y, e.g., when $M^{(+)y}$ is $Na^+$, p is 1, when M is $Al^{+++}$ p is 3, etc.

Not wanting to be bound by theory, analytical data suggest that the material generated by heating compounds of formula (I) at the listed temperature comprises a compound or a mixture of compounds one or more of which is believed to be generically represented by the empirical formula (IV):

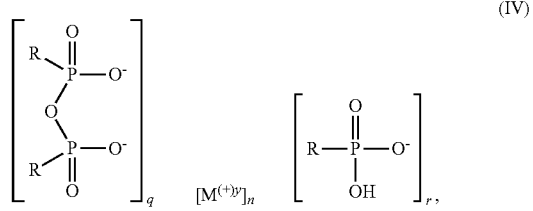

wherein R and M are as defined for formula (I), q is a number of from 1 to 7, e.g., 1, 2 or 3, r is a number from 0 to 5, e.g., 0, 1 or 2, often 0 or 1, y is a number of from 1 to 7, e.g., from 1 to 4, e.g., 1, 2, 3, or 4, and n is 1 or 2, provided that 2(q)+r=n(y). It is believed that more than one compound is typically present in the material so generated.

The phosphonic acid salts of formula (I) are known and various methods for their preparation are described in the art. For example, US 2006/0138391 discloses compounds of formula (I) wherein R is hydrogen, $C_{1-18}$ alkyl, $C_{5-6}$cycloalkyl, $C_{2-6}$ alkenyl, $C_{6-10}$ aryl, or $C_{7-11}$ aralkyl, which alkyl, alkenyl, aryl, or aralkyl can be unsubstituted or substituted by halogen, hydroxyl, amino, $C_{1-4}$ alkylamino, di-$C_{1-4}$ alkylamino, $C_{1-4}$alkoxy, carboxy or $C_{2-5}$ alkoxycarbonyl; and M can be selected from, e.g., Group IA, IB, IIA, IIB, IIIA, IVA, VA or VII of the Periodic Table, for example Li, K, Na, Mg, Ca, Ba, Zn, Ge, B, Al, Cu, Fe, Sn or Sb, etc. It is noted that in US 2006/0138391 none of the compounds corresponding to the formula (I) above were heated above 200° C. or compounded into a polymer resin at elevated temperature.

In some embodiments of the invention, the salts of formula (I) comprise compounds wherein R is $C_{1-12}$ alkyl, $C_{6-10}$ aryl, $C_{7-18}$ alkylaryl, or $C_{7-18}$ arylalkyl group, wherein said groups are further substituted as described in US 2006/0138391, but often R is unsubstituted $C_{1-12}$ alkyl, $C_{6-10}$ aryl, $C_{7-18}$ alkylaryl, or $C_{7-18}$ arylalkyl. For example, R is substituted or unsubstituted, typically unsubstituted, $C_{1-6}$ alkyl, $C_6$ aryl, $C_{7-10}$ alkylaryl, or $C_{7-12}$ arylalkyl, e.g., $C_{1-4}$ alkyl, $C_6$ aryl, $C_{7-19}$ alkylaryl, or $C_{7-10}$ arylalkyl.

While in the most general embodiments of the invention $M^{(+)y}$ may be almost any metal cation, M is generally selected from Li, K, Na, Mg, Ca, Ba, Zn, Zr, Ge, B, Al, Si, Ti, Cu, Fe, Sn or Sb, for example, e.g., Li, K, Na, Mg, Ca, Ba, Zn, Zr, B, Al, Si, Ti, Sn or Sb, in many embodiments M is Li, K, Na, Mg, Ca, Ba, Zn, Zr, B, Al, Sn or Sb, and in certain embodiments M is Al, Zn or Ca. For example, excellent results are achieved when M is Al or Ca.

R as alkyl is a straight or branched chain alkyl group having the specified number of carbons and includes e.g., unbranched alky such as methyl, ethyl, propyl, butyl, pentyl, hexyl heptyl, octyl, nonyl, decyl, undecyl, dodecyl, and unbranched alkyl such as iso propyl, iso-butyl, sec-butyl, t-butyl, ethyl hexyl, t-octyl and the like. For example, R as alkyl is methyl, ethyl, propyl, iso propyl, butyl, iso butyl, sec-buty, t-butyl, often R is methyl, ethyl, propyl or isopropyl, for example methyl.

Typically when R is aryl it is phenyl or naphthyl, for example, phenyl. Examples of R as alkylaryl include phenyl substituted by one or more alkyl groups, for example groups selected from methyl, ethyl, propyl, isopropyl, butyl, iso butyl, sec-buty, t-butyl, and the like. Examples of R as arylalkyl, include for example, benzyl, phenethyl, styryl, cumyl, phenpropyl and the like.

In one embodiment R is methyl, ethyl, propyl, isopropyl, phenyl or benzyl, e.g., methyl or phenyl.

In certain embodiments, for example, the starting material is one or more compounds of formula (I) wherein R is methyl, ethyl, propyl, isopropyl, benzyl or phenyl, M is Al, Zn or Ca, and p is 2 or 3. In one particular embodiment R is methyl, ethyl, propyl, isopropyl, or phenyl, p=3 and M is Al; in another particular embodiment R is methyl, ethyl, propyl, isopropyl, or phenyl, p=2 and M is Zn or Ca, e.g., Ca.

Typically, thermal treatment of a compound of formula (I) as above generates a material comprising more than one compound, at least one of which is believed to be generically represented by the empirical formula (IV) and complex dehydration products thereof. As is common with organometallic species, the formula (IV) is idealized and the product may include polymeric salts, complex salts, salts where certain atomic valences are shared, etc.

For example, when M is aluminum, i.e., when a compound of formula (I) wherein M is Al is heated according to the invention, elemental analysis suggests the formation of a product having an empirical formula (IV) wherein q is 1, r is 1, n is 1 and y is 3.

The flame retardant of the invention is typically a mixture of compounds. When formed from a compound of formula (I) wherein one R group and one metal is present, a mixture of compounds typically forms comprising at least one compound of formula (IV), wherein said mixture and said compound or compounds of formula (IV) comprise the one R group and the one metal. In some embodiments of the invention, the flame retardant material comprises a mixtures of compounds wherein more than one R group and/or more than one metal is present, and wherein a mixture of compounds of formula (IV) comprising more than one R group and/or more than one metal is present. Flame retardants of the invention comprising compounds containing more than one R groups and/or more than one metal can be formed in various ways.

In a first method, which can be called the intermediate salt complex method, one or more phosphonic acid compounds are treated with one or more appropriate metal compounds to give an intermediate salt complex corresponding to formula (I), which complex comprises multiple values for R and/or M. Often the metal, or at least one of the metals used in forming the intermediate salt complex will be a bidentate or polydentate metal and more than one intermediate complex may be formed. This salt complex is then heat-treated as described above to obtain a flame retardant material comprising:
a) at least one compound corresponding to formula (IV) having more than one than one R group and/or more than one M group, and/or
b) a mixture of compounds corresponding to formula (IV) are present said mixture comprising compounds with different R groups and/or different M groups.

Alternatively, in a second method, which can be called the intimate salt mixture method, two or more metal phosphonic acid salts of formula (I) are brought together to form an intimate salt mixture comprising salts which have differing values for R and/or M. This mixture is then subjected to heat treatment described above to obtain a flame retardant material comprising:
a) at least one compound corresponding to formula (IV) having more than one than one R group and/or more than one M group, and/or
b) a mixture of compounds corresponding to formula (IV) are present said mixture comprising compounds with different R groups and/or different M groups.

A third method for obtaining flame retardant materials of the invention comprising compounds of formula (IV) having multiple values for R and/or M comprises separately heating two or more individual metal phosphonic acid salts of formula (I), which differ by having different values for R and/or M, as described above to separately obtain two or more flame retardant materials of the invention, which are subsequently mixed together to form a blended flame retardant composition.

The exact composition the mixtures obtained by the preceding three processes, i.e., the intermediate salt complex method, the intimate salt mixture method, and the blending of separately obtained flame retardant materials, will generally be different even when starting from the same phosphonic acid compounds and metals. Thus, differences in physical characteristics, stability, miscibility and performance for the products of the different methods are generally encountered.

Melam, N2-(4,6-diamino-1,3,5-triazin-2-yl)-1,3,5-triazine-2,4,6-triamine), is a well-known condensation product of melamine. Derivatives of melam include compounds of melam bearing organic substituents, e.g., at a pendant amino group, including known derivatives such as

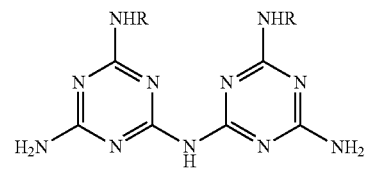

wherein R represents alkyl, a cyano group or a guanyl group. Of course the compound of the formula above when R is H, is melam. Many embodiments of the invention employ melam itself.

Polymer compositions comprising the flame retardant b) above and melam or melam derivatives exhibit excellent processing stability and flame retardancy, and surprisingly provide better results than similar compositions that use melem, melon or other melamine condensation products and derivatives thereof instead of melam or melam derivatives. For example, melam is shown herein to significantly improve the processing stability of certain flame retardant polyamide compositions whereas the incorporation of melem instead provides almost no noticeable effect.

The polymer of flame retardant composition of the present invention may be any polymer known in the art, such as polyolefin homopolymers and copolymers, rubbers, polyesters, epoxy resins, polyurethanes, polyalkylene terephthalates, polysulfones, polyimides, polyphenylene ethers, styrenic polymers and copolymers, polycarbonates, acrylic polymers, polyamides, polyacetals, epoxy resins and biodegradable polymers. Mixtures of different polymers, such as polyphenylene ether/styrenic resin blends, polyvinyl chloride/ABS or other impact modified polymers, such as methacrylonitrile and α-methylstyrene containing ABS, and polyester/ABS or polycarbonate/ABS and polyester plus some other impact modifier may also be used. Such polymers are available commercially or made by means well known in the art.

Particular embodiments are to compositions comprising thermoplastic polymers that are processed and/or used at high temperatures, for example, styrenic polymers including HIPS, polyolefins, polyesters, polycarbonates, polyamides, polyurethanes, polyphenylene ethers and the like.

For example, the polymer may be a polyester-series resin, a styrenic resin, a polyamide-series resin, a polycarbonate-series resin, a polyphenylene oxide-series resin, a vinyl-series resin, an olefinic resin, an acrylic resin, epoxy resin, or a polyurethane. The polymer can be a thermoplastic or a thermoset resin and may be reinforced, e.g., glass reinforced. More than one polymer resin may be present. In particular embodiments the polymer is an engineering polymer, e.g., a thermoplastic or reinforced thermoplastic polymer, e.g., glass reinforced thermoplastic polymer, such as an optionally glass filled polyester, epoxy resin or polyamide, for example, a glass-filled polyester such as a glass filled polyalkylene terephthalate, or a glass filled polyamide.

Polyester-series resins include homopolyesters and copolyesters obtained by, for example, polycondensation of a dicarboxylic acid component and a diol component, and polycondensation of a hydroxycarboxylic acid or a lactone component, for example, aromatic saturated polyester-series resin, such as polybutylene terephthalate or polyethylene terephthalate.

Polyamide-series resins include polyamides derived from a diamine and a dicarboxylic acid; polyamides obtained from an aminocarboxylic acid, if necessary in combination with a diamine and/or a dicarboxylic acid; and polyamides derived from a lactam, if necessary in combination with a diamine and/or a dicarboxylic acid. The polyamide also includes a copolyamide derived from at least two different kinds of polyamide constituent components. Examples of polyamide-series resins include aliphatic polyamides such as nylon 46, nylon 6, nylon 66, nylon 610, nylon 612, nylon 11 and nylon 12, polyamides obtained from an aromatic dicarboxylic acid, e.g., terephthalic acid and/or isophthalic acid, and an aliphatic diamine, e.g., hexamethylenediamine or nonamethylenediamine, and polyamides obtained from both aromatic and aliphatic dicarboxylic acids, e.g., both terephthalic acid and adipic acid, and an aliphatic diamine, e.g., hexamethylenediamine, and others. These polyamides may be used singly or in combination.

In one embodiment of the invention, the polymer comprises a polyamide that melts and is typically processed at high temperatures, e.g., 280° C. or higher, 300° C., or higher, in some embodiments 320° C. or higher, e.g. 340° C. or higher. Examples of high temperature polyamides include thermoplastic resins such as polyamide 46, polyamide 4T; polyamide MXD,6; polyamide 12,T; polyamide 10,T; polyamide 9,T; polyamide 6,T/6,6; polyamide 6,T/D,T; polyamide 6,6/6,T/6,1 and polyamide 6/6,T and the like.

The concentration of the flame retardant b) and melam component c) in the polymer composition is of course dependent on the exact chemical composition of the flame retardant, the polymer and other components found in the final polymer composition. For example, flame retardant b) may be present in a concentration of from about 1 to about 50%, e.g., 1 to 30%, by weight of the total weight of the final composition. Typically there will be at least 2% of flame retardant b) present, for example 3% or more, 5% or more, 10% or more, 15% or more, 20% or more or 25% or more. In many embodiments, flame retardant b) is present in amounts up to 45%, while in other embodiments, the amount of inventive flame retardant is 40% of the polymer composition or less, e.g., 35% or less. Obviously, when used in combination with other flame retardants or flame retardant synergists, less of flame retardant b) should be needed.

The melam and/or melam derivative of component c) is present in an amount that provides the desired improvement in processing and physical properties of the composition. In some compositions only a small amount of component c) will necessary, e.g., 1%, 2%, 3%, 4% or 5% based on the total weight of the composition, in other embodiments, 10%, 15%, 20%, 25% or more may be employed.

Any known compounding techniques may be used to prepare the flame retardant polymer composition of the invention, for example, components b) and c) may be introduced into molten polymer by blending, extrusion, fiber or film formation etc. In some cases, one or both of b) and c) is introduced into the polymer at the time of polymer formation or curing, for example, added to a polyurethane prepolymer prior to crosslinking or added to a polyamine or alkyl-polycarboxyl compound prior to polyamide formation, or to an epoxy mixture prior to cure.

In many embodiments the flame retardant polymer composition according to the invention comprises the polymer (a), the flame retardant (b), the melam and/or melam derivative (c), and (d) one or more additional flame retardants, and/or one or more synergists or flame retardant adjuvants.

For example, the flame retardant polymer composition of the invention may comprise other flame retardants such as halogenated flame retardants, alkyl or aryl phosphine oxide flame retardants, alkyl or aryl phosphate flame retardants, alkyl or aryl phosphonates, alkyl or aryl phosphinates, and salts of alkyl or aryl phosphinic acid, e.g., an aluminum tris(dialkylphosphinate) such as aluminum tris(diethylphosphinate).

For example, flame retardant polymer composition of the invention may further comprise one or more materials selected from carbon black, graphite, carbon nanotubes, silicones;

polyphenylene ether (PPE), phosphine oxides and polyphosphine oxides, e.g., benzylic phosphine oxides, poly benzylic phosphine oxides and the like;

melamine, melamine derivatives and condensation products in addition to the melam compounds of the instant invention, e.g., melem, melon, melamine salts such as, but not limited to, melamine cyanurate, melamine borate, melamine phosphates, melamine metal phosphates, and the like;

inorganic compounds including clays, metal salts such as hydroxides, oxides, oxide hydrates, borates, carbonates, sulfates, phosphates, phosphites, hypophosphites, silicates, mixed metal salts, etc., e.g., talc and other magnesium silicates, calcium silicate, aluminosilicate, aluminosilicate as hollow tubes (DRAGONITE), calcium carbonate, magnesium carbonate, barium sulfate, calcium sulfate, HALLOYSITE or boron phosphate, calcium molybdate, exfoliated vermiculite, zinc stannate, zinc hydroxystannate, zinc sulfide and zinc borate, zinc molybdate (KEMGARD 911A/B), zinc phosphate (KEMGARD 981), magnesium oxide or hydroxide, aluminum oxide, aluminum oxide hydroxide (Boehmite), aluminum trihydrate, silica, tin oxide, antimony oxide (III and V) and oxide hydrate, titanium oxide, and zinc oxide or oxide hydrate, zirconium oxide and/or zirconium hydroxide and the like.

Unless otherwise specified, in the context of the present application, the term "phosphate" when used as a component in a "phosphate salt", such as in metal phosphate, melamine phosphate, melamine metal phosphate, etc., refers to a phosphate, hydrogen phosphate, dihydrogen phosphate, pyrophosphate, polyphosphate, or a phosphoric acid condensation products anion or polyanion. Likewise, unless otherwise specified, in the context of the present application, the term "phosphite" when used as a component in a "phosphite salt", such as in metal phosphite, etc., refers to a phosphite or hydrogen phosphite.

In some particular embodiments the flame retardant polymer composition comprises one or more synergists or flame retardant adjuvants, e.g., melamine, melamine salts, phosphine oxides and polyphosphine oxides, metal salts such as hydroxides, oxides, oxide hydrates, borates, phosphates, phosphites, silicates and the like, e.g. aluminum hydrogen phosphite, a melamine metal phosphate, e.g., a melamine metal phosphate wherein the metal comprises aluminum, magnesium or zinc. In particular embodiments the one or more additional flame retardant, synergist or flame retardant adjuvant comprises an aluminum tris(dialkylphosphinate)

such as aluminum tris(diethylphosphinate), aluminum hydrogen phosphite, methylene-diphenylphosphine oxide-substituted polyaryl ether, xylylenebis(diphenylphosphine oxide), 4,4'-bis(diphenylphosphinylmethyl)-1,1'-biphenyl, ethylene bis-1,2-bis-(9,10-dihydro-9-oxy-10-phosphaphenanthrene-10-oxide)ethane, melem, or dimelamine zinc pyrophosphate.

When present, an additional flame retardant, synergist or adjuvant d) is present in a range of 100:1 to 1:100 by weight of flame retardant b) to the total weight of additional flame retardant, synergist and adjuvant. Depending on the additional flame retardant, synergist or adjuvant, excellent results can be obtained using a range of 10:1 to 1:10 by weight of flame retardant b) to additional flame retardant, synergist and/or adjuvant, for example, weight ratios ranging from 7:1 to 1:7, 6:1 to 1:6, 4:1 to 1:4, 3:1 to 1:3 and 2:1 to 1:2 are used to good benefit.

The flame retardant polymer composition of the invention will also typically contain one or more of the common stabilizers or other additives frequently encountered in the art such as phenolic antioxidants, hindered amine light stabilizers (HALS), the ultraviolet light absorbers, phosphites, phosphonites, alkaline metal salts of fatty acids, hydrotalcites, metal oxides, borates, epoxidized soybean oils, the hydroxylamines, the tertiary amine oxides, lactones, thermal reaction products of tertiary amine oxides, thiosynergists, basic co-stabilizers, for example, melamine, melem etc., polyvinylpyrrolidone, dicyandiamide, triallyl cyanurate, urea derivatives, hydrazine derivatives, amines, polyamides, polyurethanes, hydrotalcites, alkali metal salts and alkaline earth metal salts of higher fatty acids, for example, Ca stearate, calcium stearoyl lactate, calcium lactate, Zn stearate, Zn octoate, Mg stearate, Na ricinoleate and K palmirate, antimony pyrocatecholate or zinc pyrocatecholate, nucleating agents, clarifying agents, etc.

Other additives may also be present, for example, plasticizers, lubricants, emulsifiers, pigments, dyes, optical brighteners, other flameproofing agents, anti-static agents, blowing agents, anti drip agents, e.g., PTFE, and the like.

Optionally the polymer may include fillers and reinforcing agents including metal compounds and clays other than those selected as component c) of the invention, for example, calcium carbonate, silicates, glass fibers, talc, kaolin, mica, barium sulfate, metal oxides and hydroxides, carbon black and graphite. Such fillers and reinforcing agents may often be present at relatively high concentrations, including formulations where the filler or reinforcement is present in concentrations of over 50 wt % based on the weight of the final composition. More typically, fillers and reinforcing agents are present from about 5 to about 50 wt %, e.g., about 10 to about 40 wt % or about 15 to about 30 wt % based on the weight of the total polymer composition.

EXAMPLES

Flame retardant polyamide 66 formulations comprising the flame retardant obtained by heat treatment of aluminum tris-(ethylphosphonate) at 280° C. according to U.S. patent application Ser. No. 14/337,500 (FR-INV) were compounded to study the effect of adding the flame retardant synergist melam on processing stability relative the effect of other similar synergists. Three test formulations were prepared, dry blended and then compounded using a Haake Rheocord 90. Example 1 was a "blank" formulation containing polyamide 66 and the flame retardant, FR-INV. The formulation of Example 2 contained the polyamide, flame retardant and melem. The formulation of Example 3 contained the polyamide, the flame retardant and melam.

During compounding, the two formulations without melam, EX 1 and Ex 2, developed a marked torque increase over time while the formulation containing melam showed no such increase. The formulations concentrations and data are shown in the table below.

| Formulation | Ex 1 | Ex 2 | Ex 3 |
|---|---|---|---|
| Polyamide 66 | 77.8 | 62.3 | 68.7 |
| FR-INV | 22.2 | 17.1 | 22.2 |
| Melem | | 14.2 | |
| Melam | | | 15.5 |
| Torque (N-m) | >17.4[2] | >17.4[3] | 4.5[1] |

[1]Measured 6 minutes into compounding
[2]Run stopped after 2.5 minutes
[3]Run stopped after 2 minutes Surprisingly the presence of the flame retardant synergist melam significantly improved processing stability whereas a synergist of the same family did not.

What is claimed:

1. A thermoplastic flame retardant polymer composition comprising:
   a) a thermoplastic polymer;
   b) from 1% to 50%, by weight based on the total weight of the flame retardant polymer composition, of a flame retardant material obtained by a process comprising heating at temperatures of about 200° C. or higher from about 0.01 hour to about 20 hours one or more than one compound of formula (I)

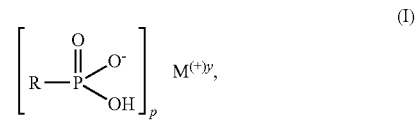

wherein
   R is $C_{1-12}$ alkyl, $C_{6-10}$ aryl, $C_{7-18}$ alkylaryl, or $C_{7-18}$ arylalkyl, wherein said alkyl, aryl, alkylaryl, or arylalkyl are unsubstituted or are substituted by halogen, hydroxyl, amino, $C_{1-14}$ alkylamino, di-$C_{1-4}$ alkylamino, $C_{1-4}$ alkoxy, carboxy or $C_{2-5}$ alkoxycarbonyl;
   M is a metal,
   y is a number of from 1 to 4 so that $M^{(+)y}$ is a metal cation where (+)y represents the charge formally assigned to the cation, and p is a number of from 1 to 4,
   wherein the flame retardant material is obtained by thermal conversion of the one or more compound of formula (I) before incorporation into the thermoplastic polymer; and
   c) one or more compounds selected from the group consisting of melam and melam derivatives, wherein components b) and c) are compounded into molten thermoplastic polymer a) to form the thermoplastic flame retardant polymer composition.

2. The thermoplastic flame retardant polymer composition according to claim 1 wherein component c) comprises melam.

3. The thermoplastic flame retardant polymer composition according to claim 1 wherein M in formula (I) is Li, K, Na, Mg, Ca, Ba, Zn, Zr, B, Al, Si, Ti, Sn or Sb.

4. The thermoplastic flame retardant polymer composition according to claim 1 wherein M in formula (I) is Al or Ca.

5. The thermoplastic flame retardant polymer composition according to claim 1 wherein in formula (I) R is unsubstituted $C_{1-6}$ alkyl, $C_6$ aryl, $C_{7-10}$ alkylaryl, or $C_{7-12}$ arylalkyl.

6. The thermoplastic flame retardant polymer composition according to claim 5 wherein R is methyl, ethyl, propyl, isopropyl, benzyl or phenyl.

7. The thermoplastic flame retardant polymer composition according to claim 6 wherein M in formula (I) is Al or Ca.

8. The thermoplastic flame retardant polymer composition according to claim 1 further comprising (d) one or more compounds selected from the group consisting of additional flame retardants, synergists and flame retardant adjuvants.

9. The thermoplastic flame retardant polymer composition according to claim 8 wherein (d) comprises one or more compounds selected from the group consisting of halogenated flame retardants, alkyl or aryl phosphate flame retardants, alkyl or aryl phosphonates, alkyl or aryl phosphinates, carbon black, graphite, carbon nanotubes, silicones; polyphenylene ether (PPE), alkyl or aryl phosphine oxides, alkyl or aryl polyphosphine oxides, melamine, melamine cyanurate, melamine borate, melamine phosphates, melamine metal phosphates, melem, melon, metal hydroxides, metal oxides, metal oxide hydrates, metal borates, metal carbonates, metal sulfates, metal phosphates, metal phosphites, metal hypophosphites, metal silicates, and mixed metal salts.

10. The thermoplastic flame retardant polymer composition according to claim 9 wherein (d) comprises one or more compounds selected from the group consisting of aluminum tris(dimethylphosphinate), aluminum tris(diethylphosphinate), aluminum tris(dipropylphosphinate), aluminum tris (dibutylphosphinate),benzylic phosphine oxides, poly benzylic phosphine oxides, talc, calcium silicate, aluminosilicate, aluminosilicate as hollow tubes, calcium carbonate, magnesium carbonate, barium sulfate, calcium sulfate, boron phosphate, calcium molybdate, exfoliated vermiculite, zinc stannate, zinc hydroxystannate, zinc sulfide and zinc borate, zinc molybdate, zinc phosphate, magnesium oxide magnesium hydroxide, aluminum oxide, aluminum oxide hydroxide, aluminum trihydrate, silica, tin oxide, antimony oxide (III and V), antimony (III and V) oxide hydrate, titanium oxide, and zinc oxide or oxide hydrate, zirconium oxide and zirconium hydroxide.

11. The thermoplastic flame retardant polymer composition according to claim 9 wherein (d) comprises one or more compounds selected from the group consisting of an aluminum tris(dialkylphosphinate), aluminum hydrogen phosphite , methylene-diphenylphosphine oxide-substituted polyaryl ether, xylylenebis(diphenylphosphine oxide), 1,2bis-(9,10-dihydro-9-oxy-10-phosphaphenanthrene-10-oxide) ethane, a 4,4'-bis(diphenylphosphinylmethyl)-1,1'-biphenyl, melem, or dimelamine zinc pyrophosphate.

12. The thermoplastic flame retardant polymer composition according to claim 1 wherein the flame retardant material (b) is obtained by a process comprising:
   i) preparing an intermediate salt complex by treating one or more phosphonic acid compound with one or more appropriate metal compound to give an intermediate salt complex corresponding to formula (I) comprising multiple values for R and/or M, and then heating the intermediate salt complex at temperatures of about 200° C. or higher for about 0.01 hour to about 20 hours; or
   ii) preparing an intimate salt mixture by combining two or more individual metal phosphonic acid salts of formula (I) which have differing values for R and/or M, and then heating the intimate salt mixture at temperatures of about 200° C. or higher for about 0.01 hour to about 20 hours; or
   (iii) heating at temperatures of about 200° C. or higher for about 0.01 hour to about 20 hours two or more separate metal phosphonic acid salts of formula (I), which differ by having different values for R and/or M to form individual flame retardant materials that are subsequently mixed together to form a blended flame retardant material.

13. The thermoplastic flame retardant polymer composition according to claim 1 wherein the thermoplastic polymer comprises one or more of a polyolefin homopolymer, polyolefin copolymer, polyester, polyurethane, styrenic polymer, styrenic copolymer, polycarbonate, acrylic polymer, polyamide, or a blend thereof.

14. The thermoplastic flame retardant polymer composition according to claim 13 wherein the thermoplastic polymer comprises one or more of a polyester, polycarbonate, or polyamide.

15. The thermoplastic flame retardant polymer composition according to claim 14 wherein the thermoplastic polymer further comprises a reinforcing agent.

16. The thermoplastic flame retardant polymer composition according to claim 15 wherein the thermoplastic polymer comprises polybutylene terephthalate, polyethylene terephthalate, glass filled polybutylene terephthalate, glass filled polyethylene terephthalate, a polyamide or a glass filled polyamide.

17. The thermoplastic flame retardant polymer composition according to claim 16 wherein the polyamide melts at 280° C. or higher.

18. The thermoplastic flame retardant polymer composition according to claim 1 wherein the thermoplastic polymer comprises one or more of a ABS, polyvinyl chloride/ABS blend, methacrylonitrile containing ABS, a-methylstyrene containing ABS, polyester/ABS, polycarbonate/ABS, impact modified polyester or impact modified polystyrene.

19. A method for preparing a thermoplastic flame retardant polymer composition, which method comprises adding to a thermoplastic polymer resin
   from 1% to 50%, by weight based on the total weight of the flame retardant polymer composition, of a flame retardant material obtained by a process comprising heating at temperatures of 200° C. or higher from 0.01 hour to 20 hours one or more than one compound of formula (I)

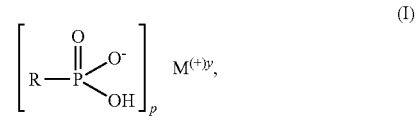

wherein
R is $C_{1-12}$ alkyl, $C_{6-10}$ aryl, $C_{7-18}$ alkylaryl, or $C_{7-18}$ arylalkyl, wherein said alkyl, aryl, alkylaryl, or arylalkyl are unsubstituted or are substituted by halogen, hydroxyl, amino, $C_{1-4}$ alkylamino, di-$C_{1-4}$ alkylamino, $C_{1-4}$ alkoxy, carboxy or $C_{2-5}$ alkoxycarbonyl;
M is a metal,
y is a number of from 1 to 4 so that $M^{(+)y}$ is a metal cation where (+)y represents the charge formally assigned to the cation, and p is a number of from 1 to 4;

and one or more compounds selected from the group consisting of melam and melam derivatives, and then melt processing the resulting mixture at elevated temperature.

* * * * *